(12) United States Patent
Charette et al.

(10) Patent No.: US 11,340,624 B2
(45) Date of Patent: May 24, 2022

(54) VEHICLE NEURAL NETWORK

(71) Applicant: Ford Global Technologies, LLC, Dearborn, MI (US)

(72) Inventors: Francois Charette, Tracy, CA (US); Jose Enrique Solomon, Belmont, CA (US)

(73) Assignee: Ford Global Technologies, LLC, Dearborn, MI (US)

(*) Notice: Subject to any disclaimer, the term of this patent is extended or adjusted under 35 U.S.C. 154(b) by 341 days.

(21) Appl. No.: 16/555,362

(22) Filed: Aug. 29, 2019

(65) Prior Publication Data
US 2021/0064047 A1    Mar. 4, 2021

(51) Int. Cl.
*G05D 1/02* (2020.01)
*G06N 3/08* (2006.01)
*G06F 17/15* (2006.01)
*G06V 20/58* (2022.01)

(52) U.S. Cl.
CPC .......... *G05D 1/0221* (2013.01); *G06F 17/15* (2013.01); *G06N 3/08* (2013.01); *G06V 20/58* (2022.01); *G06V 20/584* (2022.01); *G05D 2201/0213* (2013.01)

(58) Field of Classification Search
CPC ...... B60W 10/06; B60W 10/08; B60W 10/18; B60W 10/20; B60W 2050/0043; B60W 2050/146; B60W 2710/06; B60W 2710/08; B60W 2710/18; B60W 2710/20; B60W 50/00; B60W 50/14; G05D 1/0221; G05D 1/0246; G05D 2201/0213; G06F 17/15; G06K 9/00791; G06K 9/00805; G06K 9/00825; G06K 9/54; G06K 9/6273; G06N 3/0454; G06N 3/08; G06N 3/084
See application file for complete search history.

(56) References Cited

U.S. PATENT DOCUMENTS

| | | | | |
|---|---|---|---|---|
| 6,834,232 | B1* | 12/2004 | Malhotra | G08G 1/163 340/903 |
| 7,795,869 | B1* | 9/2010 | Bydder | G01R 33/5616 324/309 |
| 10,002,286 | B1* | 6/2018 | Prabhu | G06K 9/00288 |
| 10,109,057 | B2 | 10/2018 | Benosman et al. | |
| 10,296,999 | B2* | 5/2019 | Cai | G06T 1/0028 |
| 10,395,117 | B1* | 8/2019 | Zhang | G01C 21/206 |

(Continued)

FOREIGN PATENT DOCUMENTS

CN    107835427 A  *  3/2018

*Primary Examiner* — Babar Sarwar
(74) *Attorney, Agent, or Firm* — Frank A. MacKenzie; Bejin Bieneman PLC

(57) ABSTRACT

A computer, including a processor and a memory, the memory including instructions to be executed by the processor to generate a first color image of a road environment, determine one or more value decompositions of one or more of the red, green, and blue channels of the first color image, obtain one or more modified singular value decompositions by modifying respective ones of the singular value decompositions by a non-linear equation and reconstruct a second color image based on the modified one or more singular value decompositions. The instructions can include further instructions to train a deep neural network based on the second color image and operate a vehicle based on the deep neural network.

20 Claims, 7 Drawing Sheets

(56) References Cited

U.S. PATENT DOCUMENTS

| | | | |
|---|---|---|---|
| 10,705,525 B2* | 7/2020 | Smolyanskiy | G06K 9/00791 |
| 10,733,482 B1* | 8/2020 | Lee | G06K 9/4604 |
| 10,984,545 B2* | 4/2021 | Gu | G06N 20/20 |
| 11,126,826 B1* | 9/2021 | Karakas | G06K 9/00281 |
| 2004/0179104 A1* | 9/2004 | Benton | G01C 21/20 |
| | | | 348/207.99 |
| 2014/0341434 A1* | 11/2014 | Lin | B60R 1/00 |
| | | | 382/104 |
| 2016/0189643 A1* | 6/2016 | Uchiyama | G09G 3/3607 |
| | | | 345/690 |
| 2017/0345208 A1 | 11/2017 | Ashdown et al. | |
| 2018/0059679 A1* | 3/2018 | Taimouri | G06T 7/50 |
| 2018/0260665 A1 | 9/2018 | Zhang et al. | |
| 2018/0275658 A1 | 9/2018 | Iandola et al. | |
| 2019/0019021 A1 | 1/2019 | Hassanzadeh et al. | |
| 2019/0147582 A1* | 5/2019 | Lee | G06T 11/00 |
| | | | 382/156 |
| 2020/0090359 A1* | 3/2020 | Pillai | G06N 3/0454 |
| 2020/0232800 A1* | 7/2020 | Bai | G06K 9/6228 |
| 2020/0250984 A1* | 8/2020 | Kundu | G01C 7/02 |
| 2020/0356790 A1* | 11/2020 | Jaipuria | G06T 11/001 |
| 2020/0364876 A1* | 11/2020 | Mohan | G06F 3/012 |
| 2020/0380316 A1* | 12/2020 | Lee | G06T 7/50 |
| 2020/0394814 A1* | 12/2020 | Schulter | G06K 9/6267 |
| 2020/0401617 A1* | 12/2020 | Spiegel | G06K 9/6271 |
| 2021/0182683 A1* | 6/2021 | Dai | G06N 3/0454 |
| 2021/0201126 A1* | 7/2021 | Meng | G06N 3/0675 |
| 2021/0272289 A1* | 9/2021 | Cai | G06K 9/6271 |
| 2021/0287022 A1* | 9/2021 | Ferroni | G06K 9/00201 |
| 2021/0287430 A1* | 9/2021 | Li | G06T 7/40 |

* cited by examiner

200

500

US 11,340,624 B2

VEHICLE NEURAL NETWORK

BACKGROUND

Vehicles can be equipped with computing devices, networks, sensors and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway.

DETAILED DESCRIPTION

Figure 1:
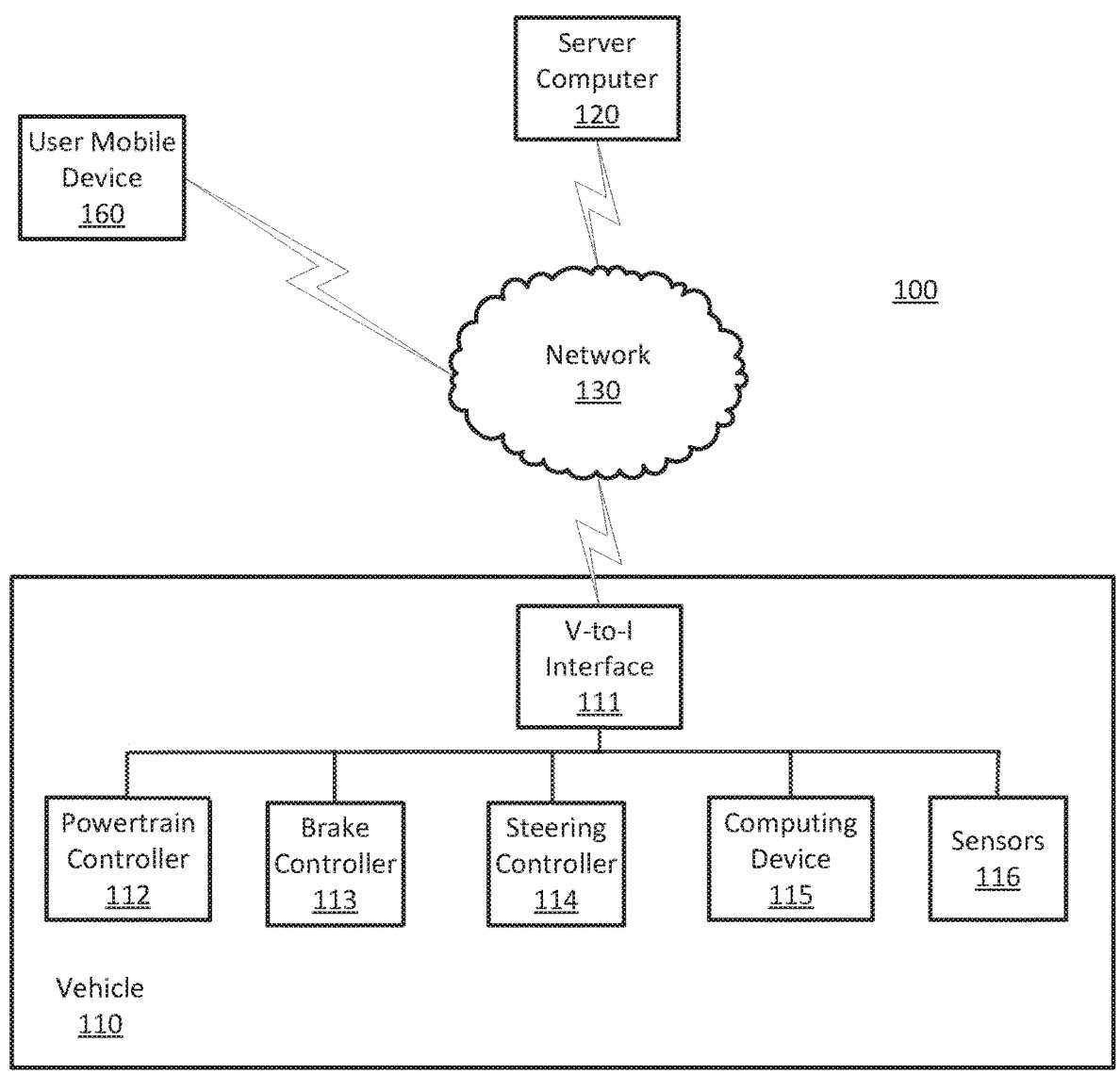
FIG. 1 is a diagram of an example traffic infrastructure system.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous mode, none of these are controlled by a computer.

A computing device in a vehicle can be programmed to acquire data regarding the external environment of a vehicle and to use the data to determine a vehicle path upon which to operate a vehicle in autonomous or semi-autonomous mode. A vehicle can operate on a roadway based on a vehicle path by determining commands to direct the vehicle's powertrain, braking, and steering components to operate the vehicle to travel along the path. The data regarding the external environment can include the location of one or more moving objects such as vehicles and pedestrians, etc., in an environment around a vehicle and can be used by a computing device in the vehicle to operate the vehicle.

A deep neural network (DNN) can be trained to operate vehicles by training the DNN using large numbers (typically >1000) of sample video images that include traffic scenes likely to be encountered by a vehicle while operating on a roadway. The more similarity between the sample video images and real video images acquired by vehicle sensors while operating on a roadway, the more likely the DNN is to provide useful data to the vehicle. To provide large numbers of sample video images that correspond to the large variety of lighting and weather conditions likely to be encountered by vehicles on roadways, color video images can be generated by acquiring images from vehicle sensors while operating on roadways and photorealistic synthetic images can be generated by synthetic image rendering software. Both color video images and photorealistic synthetic images can be processed using singular value decomposition processing to modify the images to appear as if they had be acquired under different lighting conditions and thereby simulate a wider variety of real world lighting and weather conditions than the original color video images and photorealistic synthetic images.

Disclosed herein is method including generating a first color image of a road environment, determining one or more singular value decompositions of one or more of a red, green, and blue channel of the first color image and obtaining one or more of modified singular value decompositions by modifying respective ones of the singular value decompositions by a non-linear equation. A second color image can be reconstructed based on the modified one or more singular value decompositions a deep neural network can be trained based on the second color image and a vehicle can be operated based on the deep neural network. The first color image can be generated by one or more of acquiring vehicle sensor data and generating synthetic image data. The second color image can correspond to the first color image with modified lighting conditions corresponding to darker lighting conditions including overcast lighting, evening or night. One or more singular value decompositions can be determined with a matrix equation $X=U\Sigma V^T$, wherein X is an array that includes one of a red, green, or blue color channel of the first color image, U and V are left and right eigenvectors of an array X, and $\Sigma$ is a diagonal matrix of singular values.

The singular values of diagonal matrix $\Sigma$ can be arranged in descending order wherein $\sigma_1 \geq \sigma_2 \geq \sigma_3 \ldots \geq \sigma_n$. The one or more singular value decompositions can be modified based on a non-linear equation $S=\{s-n \text{ for } s \geq S, \text{ else } 0\}$, wherein s is a singular value, n is an integer and S is a set of singular values. The deep neural network can be a convolutional neural network. The deep neural network can be trained to identify objects in the road environment including a roadway, another vehicle, and a pedestrian. The vehicle can be operated based on the deep neural network by inputting vehicle sensor data to the deep neural network which outputs object data regarding objects in the road environment. A vehicle path can be determined based on object data regarding objects in the road environment. The vehicle can be operated along the vehicle path by controlling vehicle powertrain, steering and brakes. The modified singular value decomposition can include fewer singular values than the singular valued decomposition before modification. The first color image can include an event regarded as important to deep neural network training. Training the deep neural network can include determining ground truth corresponding to the second color image.

Further disclosed is a computer readable medium, storing program instructions for executing some or all of the above method steps. Further disclosed is a computer programmed for executing some or all of the above method steps, including a computer apparatus, programmed to generate a first color image of a road environment, determine one or more singular value decompositions of one or more of a red, green, and blue channel of the first color image and obtain one or more of modified singular value decompositions by modifying respective ones of the singular value decompositions by a non-linear equation. A second color image can be reconstructed based on the modified one or more singular value decompositions a deep neural network can be trained based on the second color image and a vehicle can be operated based on the deep neural network. The first color image can be generated by one or more of acquiring vehicle sensor data and generating synthetic image data. The second color image can correspond to the first color image with modified lighting conditions corresponding to darker lighting conditions including overcast lighting, evening or night. One or more singular value decompositions can be determined with a matrix equation $X=U\Sigma V^T$, wherein X is an array that includes one of a red, green, or blue color channel of the first color image, U and V are left and right eigenvectors of an array X, and $\Sigma$ is a diagonal matrix of singular values.

The computer can be further programmed to arrange the singular values of diagonal matrix $\Sigma$ in descending order wherein $\sigma_1 \geq \sigma_2 \geq \sigma_3 \ldots \sigma_n$. The one or more singular value decompositions can be modified based on a non-linear equation $S=\{s-n \text{ for } s\geq S, \text{ else } 0\}$, wherein s is a singular value, n is an integer and S is a set of singular values. The deep neural network can be a convolutional neural network. The deep neural network can be trained to identify objects in the road environment including a roadway, another vehicle, and a pedestrian. The vehicle can be operated based on the deep neural network by inputting vehicle sensor data to the deep neural network which outputs object data regarding objects in the road environment. A vehicle path can be determined based on object data regarding objects in the road environment. The vehicle can be operated along the vehicle path by controlling vehicle powertrain, steering and brakes. The modified singular value decomposition can include fewer singular values than the singular valued decomposition before modification. The first color image can include an event regarded as important to deep neural network training. Training the deep neural network can include determining ground truth corresponding to the second color image.

FIG. 1 is a diagram of a traffic infrastructure system 100 that includes a vehicle 110 operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
FIG. 2 is a diagram of an example color video image

FIG. 2 is a diagram of a color video image 200, rendered in black and white to conform to Patent Office regulations. Color video image 200 can correspond to a road environment, where a road environment corresponds to an environment around a vehicle 110 as it travels on a roadway, for example. Color video image 200 can be acquired by a color video sensor 116 included in a vehicle 110 as it travels on a roadway. Color video image 200 can also be a photorealistic synthetic image generated by synthetic image rendering software. A photorealistic synthetic image is defined as an image that appears to a human observer as if it had been acquired by a real world video or image camera viewing a real world scene. An example of synthetic image rendering software is Unreal Engine, produced by Epic Games, Cary, N.C. 27581. Both color video images and photorealistic synthetic images can be used to train a deep neural network (DNN) to identify regions and objects in the images. For example, a DNN can be trained to recognize regions including roadways and lane markings, and objects including other vehicles and pedestrians. A trained DNN can be used to operate a vehicle 110 on a roadway by inputting a color video image 200 acquired by vehicle sensors 116 to the trained DNN and outputting data regarding regions and objects identified in the color video image 200. The data regarding regions and objects can be used by a computing device 115 to determine a vehicle path upon which to operate the vehicle 110.

Determining a vehicle path upon which to operate a vehicle 110 can include determining a vehicle path polynomial upon which to operate a vehicle 110. A vehicle path polynomial is a polynomial function that includes a series of n connected points in the X, Y plane that includes predicted vehicle 110 trajectories at n future time steps. The n connected points are determined by a polynomial function in the X, Y plane, where the X, Y axes are determined by the direction of vehicle 110, with the X direction being parallel to the direction of travel and the Y direction being perpendicular to the direction of travel, for example. Chebyshev's theorem states that n points can be represented exactly by a polynomial of degree (n−1). In this case n points, where n can be a large number, greater than 100 for example, can be represented by a polynomial of degree k, where, in this case, k can be a number less than or equal to 3, for example. The n connected points in a vehicle path polynomial can be represented by a polynomial function in X and Y of degree k or less. For example, a path polynomial can represent 10 seconds of elapsed time and can be sampled at 100 milliseconds/sample or 10 Hz to yield n=100 sample points. In this example, the n=100 sample points in vehicle path polynomial can be represented by a polynomial function in X and Y of degree 3 or less.

The polynomial function in X and Y of degree k or less that represent the vehicle path polynomial can include one or more Bezier curves. Bezier curves are polynomial functions of degree k or less that each represent a disjoint subset of the n points, and that taken together, represent the entire set of n points. Bezier curves can be constrained to be continuously differentiable and have constraints or limits on the permitted derivatives, e.g. limits on the rates of change, with no discontinuities. Bezier curves can also be constrained to match derivatives with other Bezier curves at boundaries, providing smooth transitions between subsets. Constraints on Bezier curves can make a vehicle path polynomial a steerable path polynomial by limiting the rates of longitudinal and lateral accelerations required to pilot a vehicle along the vehicle path polynomial, where braking torque and powertrain torque are applied as positive and negative longitudinal accelerations and clockwise and counter clockwise steering torque are applied as left and right lateral accelerations. By determining lateral and longitudinal accelerations to achieve predetermined target values within predetermined constraints within predetermined numbers of time periods, the vehicle path polynomial can be constrained to provide a vehicle path polynomial can be operated upon by vehicle 110 without exceeding limits on lateral and longitudinal accelerations. A computing device 115 can operate a vehicle 110 to travel along a vehicle path by controlling vehicle powertrain, steering and brakes via controllers 112, 113, 114 as discussed above in relation to FIG. 1.

Training a DNN to identify regions and objects in a color video image 200 can be performed by acquiring or synthesizing a color video image 200 of road environments including ground truth that corresponds to regions and objects included in the respective color video image 200. Ground truth is data regarding regions and objects included in a color video image 200 obtained from a source independent from the DNN. For example, a human observer can view a color video image 200 and make notes or drawings regarding regions and objects included in the color video image 200. The human observer can be assisted by a software program that permits the observer to draw overlays on the color video image 200 that define the identity, location, and size of the regions or objects, for example. Training a DNN can require using a large number (typically >1000) of color video images 200 that correspond to the large variety of traffic situations and roadway configurations that can be encountered by a vehicle 110 operating on public roadways. Training a DNN can be improved by using a large number of color video images 200 that correspond to the different lighting conditions that occur naturally because of differing times of day and weather conditions. Techniques described herein can improve DNN training by modifying a single color video image 200 to produce a plurality of color video images 200 that simulate a plurality of different lighting conditions based on singular value decomposition processing, without requiring acquiring or generating separate color video images 200 for each lighting or weather condition.

Singular value decomposition processing is a technique that decomposes a color video image 200 into singular values for each of the red, green, and blue (RGB) channel images included in a color video image 200 and adjusts the singular values to correspond to realistic lighting conditions that occur at different times of day and different weather conditions. Times of day can include, for example dawn, midday, late afternoon, and evening. Weather conditions can include, for example, direct sunlight, overcast, and haze. Adjusting the singular values in a systematic fashion to augment a data set of color video images 200 to correspond to distinct lighting conditions corresponding to different times of data and different weather conditions provides a quantifiable and systematic approach to creating color video data that corresponds to real world lighting conditions.

Singular value decomposition processing as described herein can improve training of DNNs used to operate a vehicle 110 by expanding a set of training images used to train the DNN to cover lighting conditions in addition to the lighting conditions present when an image was acquired or synthesized. This can improve DNN training in examples where a training image includes an event that occurs infrequently and can be regarded by a human observer as important to vehicle 110 operation and therefore important to the DNN training process. An important event is defined as an event that will require a computing device 115 in a vehicle 110 to perform a maneuver, such as braking or steering to avoid contacting an object in an environment around a vehicle. An example of an event that can be regarded as important to the DNN training process can be an image of a ball rolling into a street, for example. As human drivers are often taught in driver education classes, a ball rolling into a street can be sometimes be followed by a child chasing the ball and requires additional caution when operating a vehicle 110. An image of a ball rolling into a street might not be commonly encountered in typical vehicle operation but can be regarded as an important image to use in training a DNN. Using singular value decomposition processing as described herein can improve training of a DNN used to operate a vehicle 110 by expanding the number of images related to a rare but important event to present the event to a DNN in a variety of lighting conditions to permit the DNN to process subsequently process images that include similar events over a variety of lighting conditions.

A color video image 200 is composed of three distinct channels of color information, where each channel is a matrix corresponding to red, green, and blue spectral intensities in the original color image, respectively. Because each channel includes only positive integer values greater than or equal to zero, left and right eigenvalues $\vec{u}$ and $\vec{v}$, respectively, exist, although they may not be of full rank, meaning that for an m×n channel matrix, the left and right eigenvalues may have fewer than m or n non-zero values. A matrix M is defined as positive semi-definite when $x^T M x \geq 0$ for all $x \in \mathbb{R}^n$. Therefore, considering the red or R channel intensity matrix, to create a positive, semi-definite system, the left and right systems are defined as:

$$RR^T \vec{u} = \lambda \vec{u} \tag{1}$$

$$R^T R \vec{v} = \lambda \vec{v} \tag{2}$$

Where $\lambda$ are eigenvalues and $\vec{u}$ and $\vec{v}$ are correlated by $$R\vec{v} = \sqrt{\lambda} \vec{v} \tag{3}$$

where conventionally $$\sigma = \sqrt{\lambda} \tag{4}$$

and $\sigma$ is referred to as a singular value.

If matrices U and V are defined to be the complete sets of eigenvectors of the left and right hand systems (1) and (2), respectively, including the null and left-null space vectors, R can be decomposed into:

$$R = U \Sigma V^T \tag{5}$$

where $$\sum = \begin{bmatrix} \sigma_1 & & \\ & \ddots & \\ & & \sigma_n \end{bmatrix} \tag{6}$$

Where the singular values $\{\sigma_1, \ldots, \sigma_n\}$ are ordered in terms of descending magnitude, i.e.:

$$\sigma_1 \geq \sigma_2 \geq \sigma_3 \tag{7}$$

If all of the rows of the red channel R are linearly independent, which is not typical in color video imaging, the number of rows of the color video image 200 would correspond to the number of singular values $\sigma_n$. In practice, however, it is most commonly possible to create a representation that has a high fidelity to the raw image source with less than 20% of the determined singular values of the color video image 200.

Figure 3:
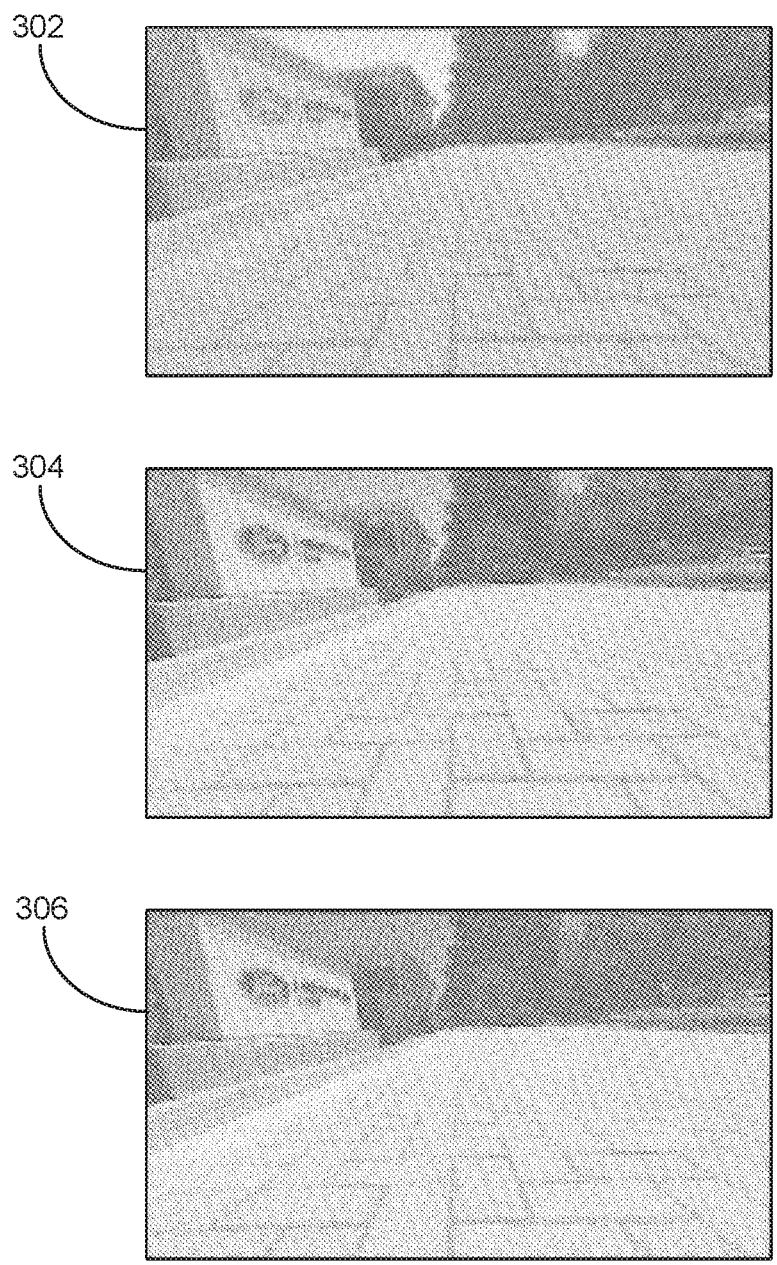
FIG. 3 are diagrams of example red, green, and blue channel images from a color video image.

FIG. 3 is a diagram of example red channel image 302, green channel image 304, and blue channel image 306 from a color video image 200, rendered in black and white to comply with Patent Office regulations. A color video image 200 can be produced by additive color mixing from the red channel image 302, green channel image 304, and blue channel image 306 for example by a color monitor attached to a computing device with a display adapter that displays the red, green, and blue channel images 302, 304, 306 on the monitor simultaneously. In this example the color video image 200 consists of 168×94 pixels, with three distinct channels 302, 304, 306 for each of the respective red, green, and blue primary colors. The red, green, and blue channel images 302, 304, 306 will each have substantially the same pixel array size as the color video image 200.

Figure 4:
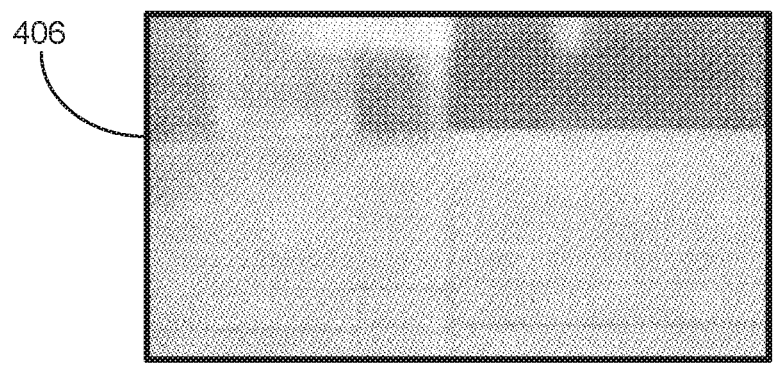
FIG. 4 is a diagram of an example processed blue channel image.

FIG. 4 is a diagram of an example altered blue channel 406 rendered in black and white to comply with Patent Office regulations. Altered blue channel 406 is an illustration of processing in which the blue segregated channel 306 B is decomposed using singular value decomposition (SVD) and reconstructed to form an altered blue channel 406. Performing an SVD on the original blue channel image 306 results in two matrices U and V and one singular value array S:

$$U_{(94,94)} S_{94} V_{(168,168)}^T = SVD(B) \tag{8}$$

Where the dimensions of the subscripts indicate the dimensions of the resulting matrices. Taking the S vector and reshaping it as a diagonal matrix such that $$\sum = \begin{bmatrix} s_1 & & \\ & \ddots & \\ & & s_{94} \end{bmatrix} \tag{9}$$

a reconstructed image based on the SVD can be reconstructed. In this example, the original blue 306 channel image is processed to darken the image to simulate early evening lighting conditions according to the non-linear equation $$S_{altered} = \{s-700 \text{ for } s \geq S, \text{ else } 0\} \tag{10}$$

Using this alteration, the altered blue channel 406 is significantly different than the original blue channel image. For example, only six of the original singular values remain, while the rest are zeros.

Figure 5:
FIG. 5 is a diagram of an example reconstructed color video image based on processed red, green, and blue channel images.

FIG. 5 is a reconstructed color image 506, rendered in black and white to comply with Patent Office regulations. Color video image 506 is formed by reconstructing the altered blue channel 406 and inserting the blue channel 406 into the reconstructed color video image 506 along with a reconstructed red channel image that had be altered according to equation (10) using the same number of singular values (six) as the altered blue 406 channel and an original green 304 channel image to form reconstructed color image 506. Reconstructed color image 506 appears darker than original color video image 200 corresponding to late afternoon lighting conditions.

The advantages of using SVD processing to alter color video image 200 lighting conditions include the fact that SVD processing is quantitative, relying on numerical parameters as in equation (10) to achieve alterations in lighting conditions, as opposed to qualitative techniques based on changing color video image 200 brightness and contrast. SVD processing handles a variety of input images in a consistent fashion and is invariant across a sequence of color video images 200. SVD processing requires no training, in contrast to neural network-based techniques and uses standard linear algebra processing to process large numbers of input color video images 200 efficiently.

SVD processing of color video images 200 improves DNN training by permitting a single input color video image 200 to be altered to produce a set of output color video images 506 with calibrated lighting conditions, which reduces the number of raw color video images 200 that need to be acquired by a test vehicle 110 or synthetized by a photorealistic rendering engine. By outputting color video image 506 where the output lighting conditions are calibrated according to the parameters of equation (10), the calibration information can be input to the DNN along with ground truth to assist in training the DNN. Because it relies on standard linear algebra operations, SVD processing is very efficient, requiring very few computational resources.

Figure 6:
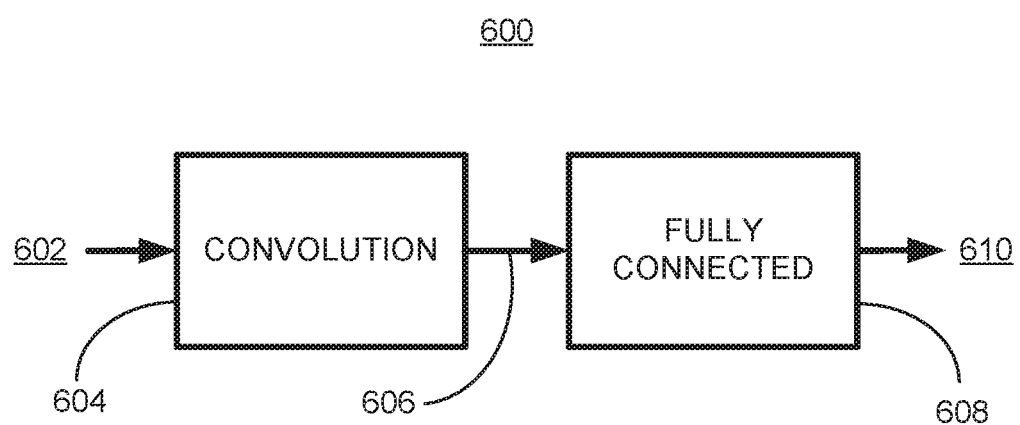
FIG. 6 is a diagram of an example deep neural network.

FIG. 6 is a diagram of a deep neural network (DNN) 500. A DNN is a software program executed on a computing device 115 that takes as input a color video image 602 processed according to equations (8)-(10), above. The DNN 600 processes the color video image 602 by first convolving the color video image 602 using convolutional layers (CONVOLUTION) 604 to form hidden variables 606. The hidden variables 606 are then processed by fully connected layers (FULLY CONNECTED) 608 to form output states 610. The output states include data regarding regions and objects included in the input color video image 602 including roadways, lane markings, other vehicles and pedestrians. A computing device 115 included in the vehicle 110 can use the output states 610 to operate the vehicle. Computing device 115 can determine a vehicle path to direct the vehicle 110 to travel in a lane determined by lane markings detected by the DNN 600 while avoiding contact with detected objects. The vehicle path can be a series of connected polynomial functions of degree three or less. The computing device 115 can operate the vehicle 110 by directing vehicle controllers 112, 113, 114 to control vehicle powertrain, steering and brakes.

The DNN 600 can be trained by inputting a plurality of training color video image 602 along with ground truth data obtained from human observers analyzing the color video images 602. Ground truth includes descriptions of regions and objects in the synthetic images including roadways, lane markings, and objects including other vehicles and pedestrians. Input ground truth can be compared to the output states 610 back propagated by the DNN 600 during training to determine whether the DNN 600 has correctly detected and identified regions and objects in the output states 610. Once the DNN 600 has been trained, input color video images 602 will be processed by the DNN 600 to produce output states 610 that correspond to the regions and objects in the input color video image 602.

Figure 7:
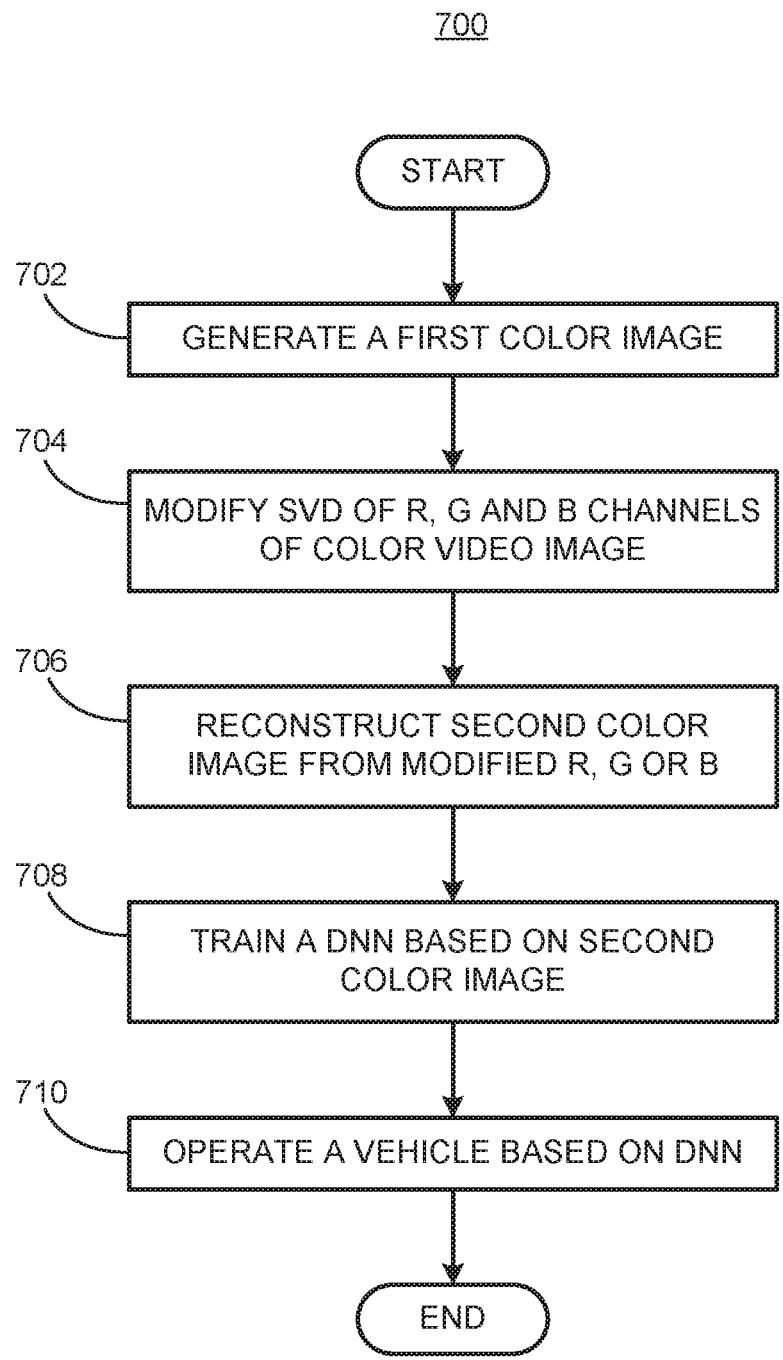
FIG. 7 is a flowchart diagram of an example process to operate a vehicle using a deep neural network.

FIG. 7 is a diagram of a flowchart, described in relation to FIGS. 1-6, of a process 700 for operating a vehicle based on output from a DNN 600. Process 700 can be implemented by a processor of computing device, taking as input information from sensors, and executing commands, and outputting object information, for example. Process 700 includes multiple blocks that can be executed in the illustrated order. Process 700 could alternatively or additionally include fewer blocks or can include the blocks executed in different orders.

Process 700 begins at block 702, where a color video image 200 is acquired by vehicle sensors 116 included in a vehicle 110 or generated by a synthetic image rendering engine as discussed above in relation to FIG. 2. The color video image 202 is one of a large number (typically >1000) of color video images 200 acquired or generated to simulate road environments that a vehicle 110 can encounter when operating in the real world. Color video image 200 can be analyzed by a human observer to obtain ground truth data for training a DNN 600.

At block 704 the color video image 200 is input to an SVD process to modify one or more of the RGB color channels by modifying singular values of the R, G or B color channels as described above in relation to FIGS. 3 and 4 and equations (8)-(10).

At block 706 the altered RGB color channels are reconstructed to form a reconstructed color image 506 with altered lighting conditions based on the modified singular values from block 704.

At block 708 a DNN is trained based on reconstructed color images 506 and accompanying ground truth as described above in relation to FIG. 6.

At block 710 a DNN 500 trained at block 708 is used by a computing device 115 to operate a vehicle 110. The computing device 115 can acquire color video image data 602 from a video sensor 116 included in the vehicle 110 and process the image data 602 to generate output states 610 including roadways, lane markers, and objects including other vehicles and pedestrians. The computing device 115 can use the output states 610 to determine a vehicle path and control vehicle powertrain, steering and brakes to cause vehicle 110 to operate along the vehicle path as described above. Following block 708 process 700 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising a processor; and
a memory, the memory including instructions to be executed by the processor to:
generate a first color image of a road environment;
determine one or more singular value decompositions of one or more of a red, green, and blue channel of the first color image;
obtain one or more modified singular value decompositions by modifying respective ones of the singular value decompositions by a non-linear equation corresponding to modified lighting conditions;
reconstruct a second color image based on the modified one or more singular value decompositions;
train a deep neural network based on the second color image; and
operate a vehicle based on the deep neural network.

2. The computer of claim 1, the instructions including further instructions to generate the first color image by one or more of acquiring vehicle sensor data and generating synthetic image data.

3. The computer of claim 1, wherein the modified lighting conditions correspond to darker lighting conditions including overcast lighting, evening or night.

4. The computer of claim 1, the instructions including further instructions to determine the one or more singular value decompositions including with a matrix equation $X=U\Sigma V^T$, wherein X is an array that includes one of a red, green, or blue color channel of the first color image, U and V are left and right eigenvectors of array X, and $\Sigma$ is a diagonal matrix of singular values.

5. The computer of claim 1, the instructions including further instructions to modify the one or more singular value decompositions based on a non-linear equation $S=\{s-n$ for $s \geq S$, else $0\}$, wherein s is a singular value, n is an integer and S is a set of singular values.

6. The computer of claim 1, wherein the deep neural network is convolutional neural network.

7. The computer of claim 1, the instructions including further instructions to train the deep neural network to identify objects in the road environment including a roadway, another vehicle, and a pedestrian.

8. The computer of claim 1, the instructions including further instructions to operate the vehicle based on the deep neural network by inputting vehicle sensor data to the deep neural network which outputs data regarding objects in the road environment.

9. The computer of claim 8, the instructions including further instructions to operate the vehicle based on determining a vehicle path based on the data regarding objects in the road environment.

10. The computer of claim 9, the instructions including further instructions to operate the vehicle along the vehicle path by controlling vehicle powertrain, steering and brakes.

11. A method, comprising:
generating a first color image of a road environment;
determining one or more singular value decompositions of one or more of a red, green, and blue channel of the first color image;
obtaining one or more of modified singular value decompositions by modifying respective ones of the singular value decompositions by a non-linear equation corresponding to modified lighting conditions;
reconstructing a second color image based on the modified one or more singular value decompositions;
training a deep neural network based on the second color image; and
operating a vehicle based on the deep neural network.

12. The method of claim 11, further comprising generating the first color image by one or more of acquiring vehicle sensor data and generating synthetic image data.

13. The method of claim 11, wherein the modified lighting conditions correspond to darker lighting conditions including overcast lighting, evening or night.

14. The method of claim 11, further comprising determining one or more singular value decompositions including with a matrix equation $X=U\Sigma V^T$, wherein X is an array that includes one of a red, green, or blue color channel of the first color image, U and V are left and right eigenvectors of an array X, and $\Sigma$ is a diagonal matrix of singular values.

15. The method of claim 11, further comprising modifying the one or more singular value decompositions based on a non-linear equation $S=\{s-n \text{ for } s \geq S, \text{ else } 0\}$, wherein s is a singular value, n is an integer and S is a set of singular values.

16. The method of claim 11, wherein the deep neural network is convolutional neural network.

17. The method of claim 11, further comprising training the deep neural network to identify objects in the road environment including a roadway, another vehicle, and a pedestrian.

18. The method of claim 11, further comprising operating the vehicle based on the deep neural network by inputting vehicle sensor data to the deep neural network which outputs object data regarding objects in the road environment.

19. The method of claim 18, further comprising determining a vehicle path based on the object data regarding objects in the road environment.

20. The method of claim 19, further comprising operating the vehicle along the vehicle path by controlling vehicle powertrain, steering and brakes.

* * * * *